United States Patent [19]
Polidoro

[11] Patent Number: 5,182,436
[45] Date of Patent: Jan. 26, 1993

[54] PORTABLE BENCH-TYPE ELECTRIC IGNITE FOR GAS WELDING TORCHES

[76] Inventor: Gilbert J. Polidoro, 4222 Touchstone Ct., Las Vegas, Nev. 89108

[21] Appl. No.: 732,625

[22] Filed: Jul. 19, 1991

[51] Int. Cl.$^5$ ............................ F23Q 7/00; H05B 3/00
[52] U.S. Cl. .................... 219/262; 219/267; 219/268; 361/264; 431/128
[58] Field of Search ............... 219/260–270; 361/264–266; 431/127, 128; 123/145 R, 145 A

[56] References Cited

U.S. PATENT DOCUMENTS

| | | | |
|---|---|---|---|
| 45,241 | 11/1864 | Gardiner | 361/266 X |
| 215,722 | 5/1879 | Cointepas | 431/128 |
| 520,445 | 5/1894 | Misell | 431/128 |
| 742,661 | 10/1903 | Hubert | 431/128 |
| 839,306 | 12/1906 | Misell | 431/128 X |
| 874,357 | 12/1907 | Dickens | 219/268 |
| 1,584,423 | 5/1926 | Bate | 219/262 |
| 1,915,446 | 6/1933 | Pressler | 431/128 |
| 2,146,561 | 2/1939 | Cady | 219/260 X |
| 2,159,769 | 5/1939 | Negbaur | 219/268 |
| 2,482,851 | 9/1949 | Arden | 219/270 X |
| 2,723,337 | 11/1955 | Kempler | 219/261 |
| 2,795,220 | 6/1957 | Atwood et al. | 123/145 R |
| 3,090,856 | 5/1963 | Rorvig | 361/264 |
| 3,454,742 | 7/1969 | O'Brien | 219/267 X |
| 3,863,112 | 1/1975 | Kessock | 219/268 X |
| 3,919,522 | 11/1975 | Wahl et al. | 219/270 X |
| 4,088,105 | 5/1978 | Bhat et al. | 123/145 R |
| 4,108,592 | 8/1978 | Fair | 431/128 |
| 4,113,423 | 9/1978 | Steiner | 431/128 |

FOREIGN PATENT DOCUMENTS

| | | | |
|---|---|---|---|
| 914587 | 6/1946 | France | 219/270 |
| 616605 | 1/1949 | United Kingdom | 431/128 |

Primary Examiner—Anthony Bartis

[57] ABSTRACT

A portable gas torch igniter includes a housing having a flame duct formed therein for the introduction of a gas torch. The flame duct is open at its rear end and has a front portion arranged substantially horizontally and has an open front end into which the torch tip can be inserted. A rear portion of the flame duct is directed upwardly at an angle in the range between 35 degrees and 55 degrees for directing the resulting flame up and away from the rear of the torch igniter. A glow plug is secured to a surface of the flame duct. An electric power source provides an electric current to the glow plug. Appropriate electrical connections are provided including an electrical switch attached to the housing for conducting electric current between the power source and the glow plug. The electrical switch is positioned so as to switch on when a tip of the welding torch is positioned in proximity to the glow plug.

9 Claims, 3 Drawing Sheets

PORTABLE BENCH-TYPE ELECTRIC IGNITE FOR GAS WELDING TORCHES

BACKGROUND OF THE INVENTION

1. Field of the Invention

The present invention relates to gas igniters and more particularly to a gas igniter which uses a glow plug for igniting combustible gases emitted by welding torches.

2. Description of the Related Art

Commonly, the lighting of conventional gas torches for welding, cutting, etc., is accomplished by flint lighters in which the operator must strike a spark with the flint while holding the torch close to the flint. These flint lighters have certain inherent disadvantages. For example, the operator is not always able to quickly strike a sufficient spark to enable him to quickly light his torch. In addition, the operator must handle both the torch and the flint lighter at the same time, which is awkward and inconvenient. Also, the flints wear out and must be replaced. Additionally, the use of flint lighters normally requires that both hands of the operator be occupied which is highly undesirable in certain operations. Furthermore, use of these flint lighters generally require the operator's hand to be positioned in close proximity to the torch which may result in painful burning of the hand of the operator.

In view of these safety problems several hand-held electric ignition devices have been developed which allow the operator to keep his hands well away from the torch. For example, U.S. Pat. No. 3,919,522 discloses a cordless electric ignition tool having a handle portion comprising a housing containing a battery, a pair of terminals and a normally open switch in circuit with the battery and the terminals.

U.S. Pat. No. 874,357, discloses another hand-held lighter. The '357 lighter includes a hollow body and means associated with the body for closing an electric circuit associated with the body with either a resistance in or out of the same. This introduction of resistance helps prevent injury to the hollow body.

Although helping to reduce the possibility of the operator burning his hand these hand-held designs still require the operator to use both his hands. U.S. Pat. No. 3,090,856, entitled "GAS TORCH LIGHTER", issued to H. Rorvig, discloses a torch lighter having a housing which is fastened to a workbench. The housing has a heating unit mounted on the top thereof. The heating or igniting unit includes a coil of high resistance wire such as Nichrome which is wound about a suitably insulated mounting block. The torch lighter includes electrical cables and a suitable plug for connecting it to a source of electric current.

The igniting coil is enclosed by a hood for confining the gas from the torch in the area immediately surrounding the igniting coil to permit quick igniting or lighting thereof. A switch unit is also mounted atop the box in front of the heating unit and preferably in substantial alignment therewith. This switch unit comprises a pair of circuit breakers, each having opposed, disconnected convex ends defining therebetween a valley or seat for receiving the tip or nozzle of a gas torch.

To light the torch, the operator rests the tip of the gas torch in the valley provided by the convex ends to bridge the gap with the nozzle directed towards the heating unit. The engagement of the tip of the torch with the contact elements closes the circuit of the torch lighter and causes the heating coil to heat to a high temperature sufficient to ignite the gas from the torch.

Although the Rorvig device obviates many of the difficulties inherent with prior art torch igniters, there is substantial room for improvement. The Rorvig device is dependent upon an external electric source. Use of an electrical cord at a welding table can be very dangerous. Furthermore, it is secured to the workbench and cannot easily be moved from one location to another. Additionally, the hood for enclosing the igniting coil is relatively wide, shallow, and of a rectangular cross-section and consequently does little to control the direction of the flame.

OBJECTS AND SUMMARY OF THE INVENTION

A principal object of the present invention, therefore, is to provide a self-contained torch lighting device which is simple in design, inexpensive in construction and extremely easy to operate.

Another object is to enable the operator of a torch igniter to quickly light the torch by using only a single hand and permit his other hand to be free for other purposes.

Another object is to permit a minimum amount of gas to be employed in igniting an acetelyene torch.

Still another object is permit the gas igniting element of a torch igniter to be turned on momentarily and controlled by the positioning of the nozzle of the torch near the gas igniting element.

Yet another object of the present invention is to confine the gas from the torch in the area immediately surrounding the igniting element to permit quick igniting thereof.

These and other objects are achieved by the present invention which is a portable gas torch igniter. In its broadest aspects the gas torch igniter comprises a housing having a flame duct formed therein for the introduction of a gas torch; a glow plug secured to a surface of the flame duct; an electric power source for providing an electric current to the glow plug; and, electrical connection means including an electrical switch attached to the housing for conducting electric current between the power source and the glow plug. The electrical switch is positioned so as to switch on when a tip of the welding torch is positioned in proximity to the glow plug.

In its more narrow aspects the surfaces forming the flame duct form an elbow. The glow plug is positioned at the bend of the elbow for allowing the tip of the welding torch to be easily placed in the vicinity of the glow plug thereby enhancing the effective lighting ability of the glow plug.

The flame duct is elongated and has a circular cross-section. The rear portion of the flame duct is directed upwardly at an angle preferably in the range between 35 degrees and 55 degrees while the front portion of the flame duct is approximately horizontal. Thus, the flame is directed up and away from the rear of the device. This greatly decreases the likelihood of igniting flammable materials on the table in the vicinity of the torch igniter. The circular cross-section creates favorable convection currents.

Batteries located within the housing weight down the housing, thereby providing proper support.

Other objects, advantages and novel features of the present invention will become apparent from the following detailed description of the invention when con-

BRIEF DESCRIPTION OF THE DRAWINGS

The same elements or parts throughout the figures of the drawings are designated by the same reference characters.

DETAILED DESCRIPTION OF THE INVENTION

Figure 1:
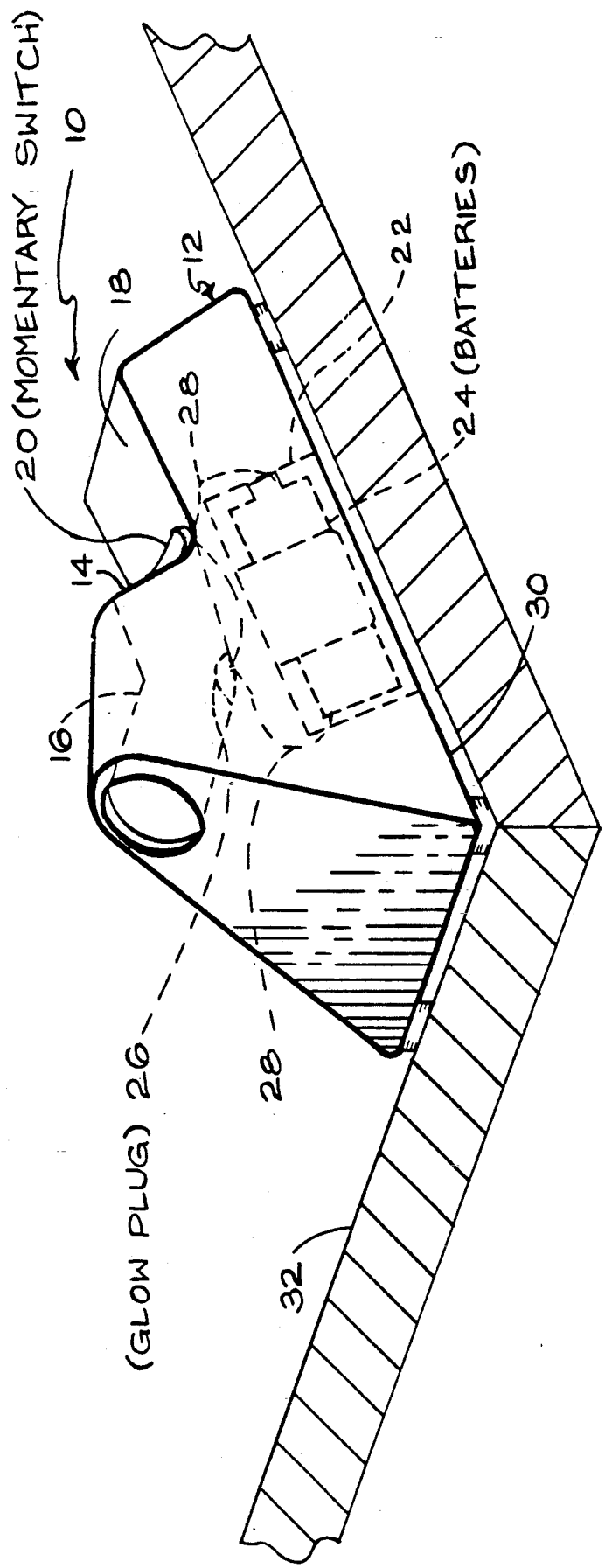
FIG. 1 is a perspective illustration of the gas torch igniter of the present invention.

Referring to the drawings and the characters of reference marked thereon FIG. 1 illustrates the portable gas torch igniter of the present invention, designated generally as 10. Torch igniter 10 includes a housing 12.

The rear portion of housing 12 has an upper extension 14 having a flame duct (illustrated by phantom lines 16) formed therein for the introduction of a gas torch. The lower level 18 of the resulting split level upper surface of the housing 12 includes a normally open electricl switch 20, which is preferably a micro-momentary switch. A battery compartment 22 is formed within the bottom of the housing 12 for containing batteries 24. The batteries 24 provide a source of power for a glow plug 26 via electrical connection means 28. The housing 12 includes a substantially flat bottom surface 30 for providing the ability of the igniter 10 to be used as a bench-type device, supported on a table or other support surface 32.

The glow plug 26 may be, for example, a conventional type such as those used in internal combustion engines of model airplanes and the like. In such conventional glow plugs, generally a source of current is attached to the center pin and ground of the glow plug which results in the heating of a resistance element of the glow plug. In most conventional glow plugs a terminal pin, with an annular flange on its projecting radially from the pin intermediate the ends of the pin, is mounted in a hollow cylindrical body. The pin is insulated from the body by plastic or fiber insulators, and is held in place by a mechanical crimp or threaded sleeve. Such a glow plug is illustrated and described in U.S. Pat. No. 2,482,831, issued to Arden. The Arden reference is hereby incorporated by reference. A conventional glow plug is also described and illustrated in U.S. Pat. No. 4,088,105, issued to Bhat et al, also incorporated herein by reference. It has been found that two 1.5 volt dry cell batteries provide sufficient power to effectively energize these aforementioned glow plugs. The preferred glow plug has a major diameter of approximately 5/16 inch and a resistance element of approximately 1/16 of an inch in diameter.

Figure 2:
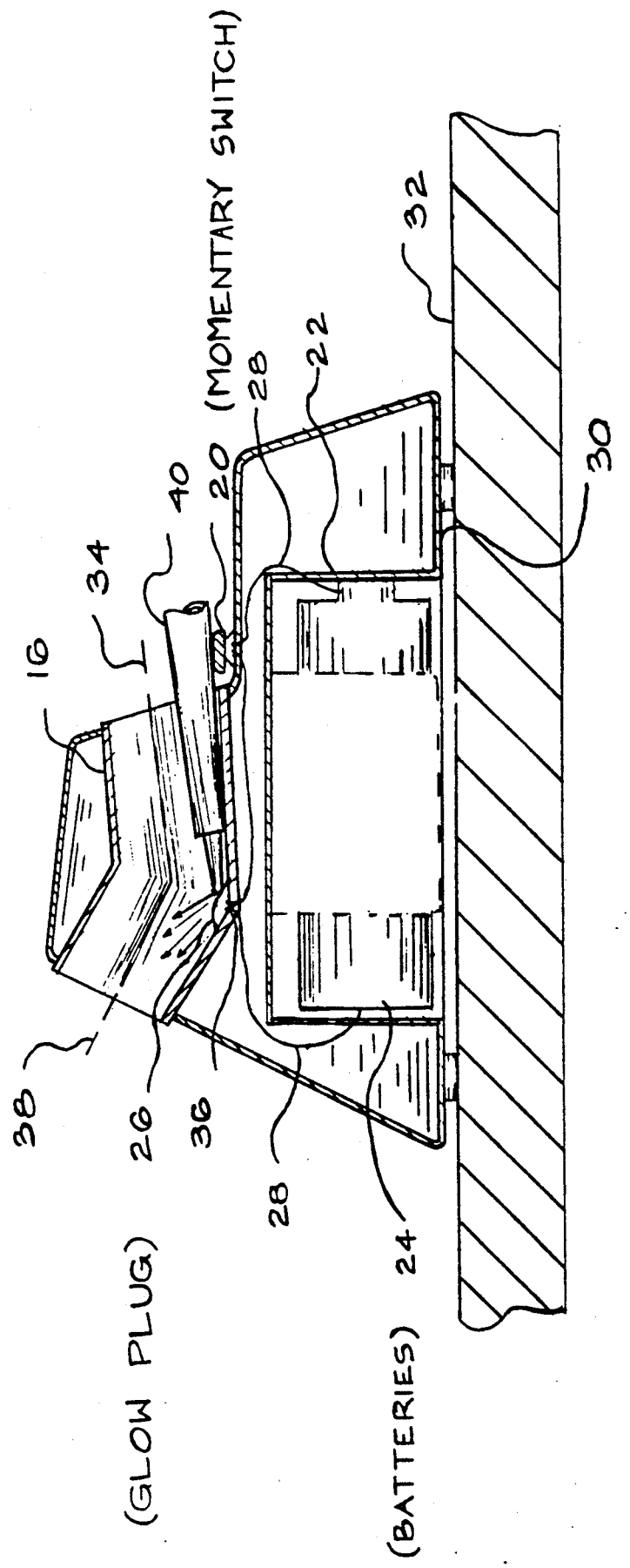
FIG. 2 is a side view of the gas torch igniter, illustrating the placement of a welding torch therein.

Referring now to FIG. 2, it may be readily seen that the front portion 34 of an imaginary axis defining the center line of the flame duct 14 is approximately parallel to the support surface 32. The imaginary axis 34 is oriented slightly downwardly to more easily accommodate access to the flame duct 16 for the operator. The flame duct 16 has an elbow 36 for allowing the tip of a welding torch 40 to be easily placed in the vicinity of the glow plug 26, thereby enhancing the effective lighting ability of the glow plug 26. A rear portion 38 of the axis defining the center line of the flame duct 16 is oriented upwardly to decrease the likelihood of igniting flammable materials on the table in the vicinity of the torch igniter. The flame duct may be, for example, approximately ⅜ inch in diameter and formed of copper.

Figure 3:
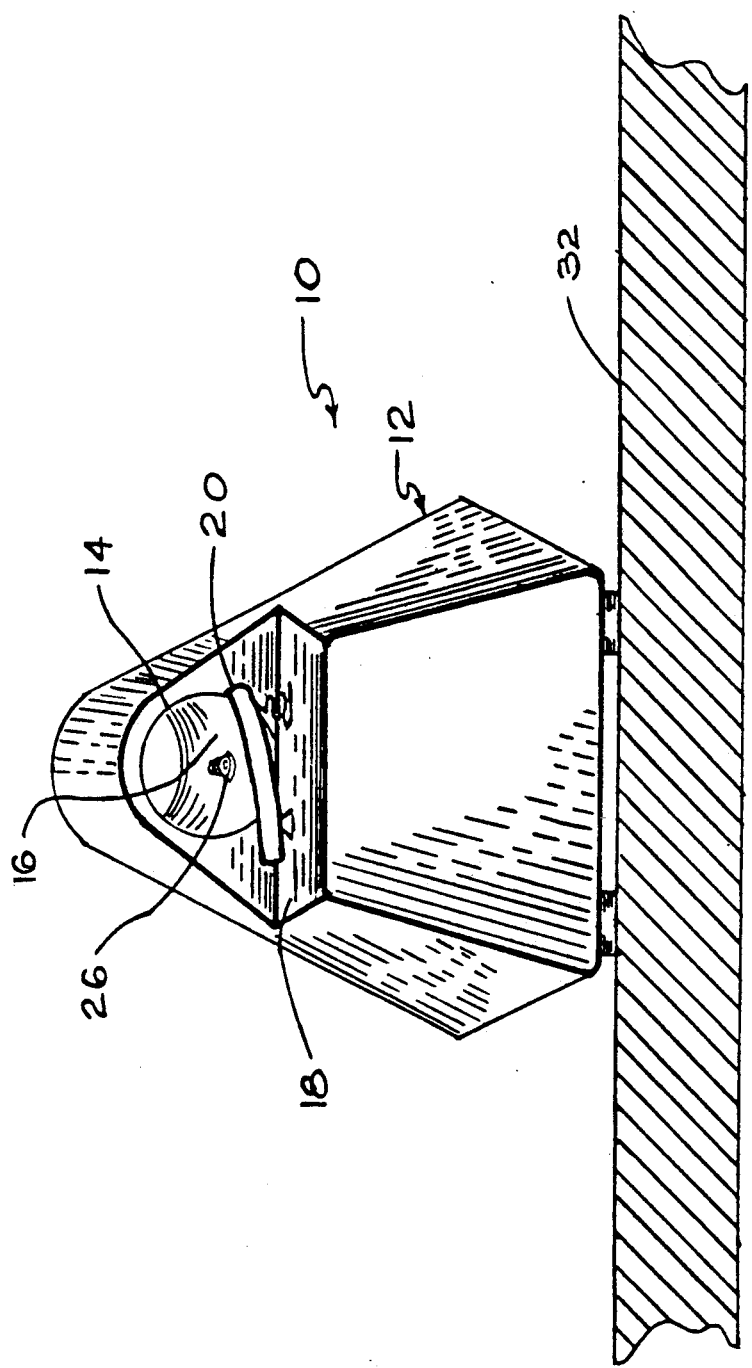
FIG. 3 is an end view of the gas torch igniter.

The normally open electrical switch 20 is mounted on the lower level 18 of the split level upper surface of the housing 12. The electrical switch 20 is preferably a low resistance micro-momentary switch. It is aligned with the entrance of the flame duct 16, as can be seen by reference to FIG. 3.

During operation of the igniter 10 the tip of the torch 40 is introduced through the entrance of the flame duct 16 and comes naturally to rest at the elbow 36 adjacent to the glow plug 26. During this same motion the momentary switch 20 becomes depressed, closing the electrical circuit 28 and thereby activating the glow plug 26.

The apparatus of the present invention is particularly useful with regard to metal welding shops, production-type welding environments, and for gem repair and manufacturing.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A portable gas torch igniter, comprising:
   a) a housing having a flame duct formed therein for the introduction of a gas torch;
   b) a glow plug secured to a surface of said flame duct;
   c) an electric power source for providing an electric current to said glow plug, said power source comprising a battery; and,
   d) electrical connection means including an electrical switch attached to said housing for conducting electric current between said power source and said glow plug, said electrical switch being positioned so as to switch on when a tip of said welding torch is positioned in proximity to said glow plug, wherein said flame duct is open at its rear end and has a front portion arranged substantially horizontally and has an open front end into which the torch tip can be inserted, and wherein a rear portion of said flame duct is directed upwardly at an angle in the range between 35 degrees and 55 degrees for directing the resulting flame up and away from the rear of said torch igniter.

2. The gas torch igniter of claim 1, wherein said electrical switch includes a micro-momentary switch.

3. The gas torch igniter of claim 2, wherein said battery is contained within said housing.

4. The gas torch igniter of claim 3, wherein a rear portion of said housing includes an upper extension thereon having said flame duct formed therein, a front portion of said housing having an upper support surface for supporting said electrical switch.

5. The gas torch igniter of claim 4, wherein surfaces forming said flame duct form an elbow, said glow plug being positioned at the bend of said elbow for allowing the tip of said welding torch to be easily placed in the vicinity of said glow plug thereby enhancing the effective lighting ability of said glow plug.

6. The gas torch igniter of claim 5, wherein said flame duct has a substantially circular cross-section.

7. A bench-type acetylene torch igniter, comprising:
   a) a housing having a split level upper surface thereon, the lower level of said split level surface supporting a momentary switch, the upper level of said split level surface being formed by an upper extension of said housing, a flame duct being formed within said upper extension for the introduction therein of a welding torch;
b) a glow plug secured to a surface of said flame duct;
c) an electric power source for providing an electric current to said glow plug; and,
d) electrical connection means for conducting electric current from said power source to said glow plug, said momentary switch being positioned so as to switch on when a tip of said welding torch is positioned within said flame duct in proximity to said glow plug,
wherein said flame duct is open at its rear end and has a front portion arranged substantially horizontally and has an open front end into which the torch tip can be inserted, and wherein a rear portion of said flame duct is directed upwardly at an angle in the range between 35 degrees and 55 degrees for directing the resulting flame up and away from the rear of said torch igniter.

8. The gas torch igniter of claim 7, wherein surfaces forming said flame duct form an elbow, said glow plug being positioned at the bend of said elbow for allowing the tip of said welding torch to be easily placed in the vicinity of said glow plug thereby enhancing the effective lighting ability of said glow plug.

9. The gas torch igniter of claim 7, wherein said housing includes a substantially flat bottom surface for providing the ability of said igniter to be used as a bench-type device.

* * * * *